Patented Oct. 20, 1925.

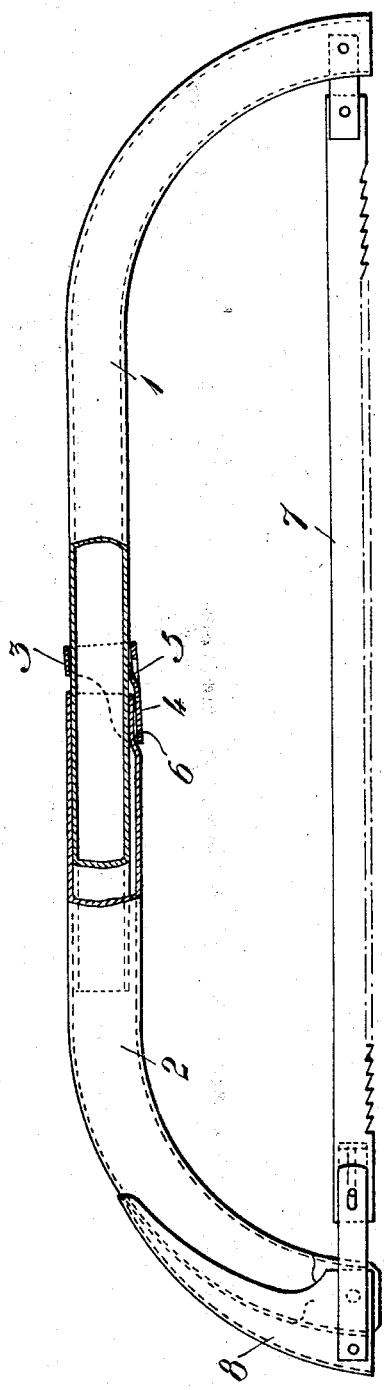

1,558,315

UNITED STATES PATENT OFFICE.

ERIK TIMANDER, OF ORSA, SWEDEN.

SAW FRAME.

Application filed October 18, 1924. Serial No. 744,370.

*To all whom it may concern:*

Be it known that I, ERIK TIMANDER, a subject of the King of Sweden, residing at Orsa, Sweden, have invented new and useful Improvements in Saw Frames, of which the following is a specification.

This invention relates to improvements in saw-frames, consisting of two tube-pieces, the one sliding within the other, and more particularly the invention relates to a locking device for automatically connecting the said pieces at their relative movement at the clamping of the saw blade in the saw-frame.

The said locking device consists of a locking ring, loosely sliding on the one tube-piece, and means provided on the other tube-piece for causing the said ring to tilt and to catch into its tube-piece when the two pieces are pushed together; the ring thus forms a stop for the other tube-piece and prevents any further movement of it.

A constructional form of the invention is illustrated in the accompanying drawing, which illustrates a saw in elevation and partial section.

1 and 2 are the two tube-pieces of which the saw-frame consists, 3 is the loose locking ring sliding on the tube-piece 1, which in its turn slides in the other tube-piece 2. The locking ring 3 is provided with a projection 4 which when the ring is pushed against the end of the tube-piece 2 cooperates with this end and causes the ring to tilt and to catch into its tube-piece 1, thereby preventing the two tube-pieces to be pushed together furthermore at the clamping of the blade. For facilitating the tilting movement the end of the tube-piece 2 is provided with a depression 6 at the place where the projection 4 cooperates with the tube-piece 2. 5 is a spring-tongue which suitably is pressed out from the ring 3 and acts as a retainer preventing the ring from falling off when the tube-piece 1 is taken away from the tube-piece 2.

When the saw blade 7 is to be clamped the two pieces 1, 2 are drawn outwards as long as the saw blade permits and the ring 3 is pushed towards the tube piece 2 so that the projection 4 slips up in the depression 6. When the blade thereupon is clamped by means of the clamping device 8, the lower edge of the end of the outer tube piece 2 acts as a wedge upon the projection 4 and tilts the ring 3 in the plane of the saw to the inclined position, shown on the drawing, thereby locking the ring to the tube piece 1, so that the ring prevents any inward movement of the part 2 as long as the saw blade is clamped in the frame.

Having now particularly described the nature of my invention and the manner of its operation, what I claim is:

1. A saw frame comprising two tube-pieces, the one sliding within the other, a locking ring, sliding on the one tube-piece, an edge part on the other tube-piece for directly pushing against and tilting the locking ring and causing it to bind upon its tube-piece when the two tube-pieces are pushed together.

2. A saw frame comprising two tube-pieces, the one sliding within the other, a locking ring sliding on the one tube-piece, a projection on the ring facing the adjacent end of the other tube-piece and means on the latter tube piece for engaging between said projection and its tube to tilt the locking ring and cause it to bind upon its tube-piece when the two tube-pieces are pushed together.

3. A saw frame comprising two tube-pieces, the one sliding within the other, a locking ring sliding on the one tube-piece, a projection on the ring facing the adjacent end of the other tube-piece and a depression in the latter tube-piece which depression is received within the ring and cooperates with the projection for tilting the locking ring and causing it to bind upon its tube-piece when the two tube-pieces are pushed together.

4. A saw frame comprising two tube-pieces, the one sliding within the other, a locking ring sliding on the one tube-piece, a projection on the ring facing the adjacent end of the other tube-piece and an edge part on the latter tube-piece for engaging between said projection and its tube in order to push against and tilt the locking ring and cause it to bind upon its tube-piece when the two tube-pieces are pushed together.

5. A saw frame comprising two tube-pieces, the one sliding within the other, a locking ring sliding on the one tube-piece, a projection on the ring facing the adjacent end of the other tube-piece and a depression in a part of the edge of the latter tube-piece which depression is received within the ring and cooperates with the projection for tilting the locking ring and causing it to catch into its tube-piece when the two tube-pieces are pushed together.

In testimony whereof I have signed my name to this specification.

E. TIMANDER.